(12) United States Patent
Maidee

(10) Patent No.: US 12,373,353 B2
(45) Date of Patent: Jul. 29, 2025

(54) SYSTEMS AND METHODS FOR DECENTRALIZED ADDRESS TRANSLATION

(71) Applicant: Xilinx, Inc., San Jose, CA (US)

(72) Inventor: Pongstorn Maidee, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/336,564

(22) Filed: Jun. 16, 2023

(65) Prior Publication Data
US 2025/0199964 A1 Jun. 19, 2025

(51) Int. Cl.
*G06F 12/1045* (2016.01)
*G06F 12/0897* (2016.01)

(52) U.S. Cl.
CPC ...... *G06F 12/1045* (2013.01); *G06F 12/0897* (2013.01)

(58) Field of Classification Search
CPC .......................... G06F 12/1045; G06F 12/0897
See application file for complete search history.

(56) References Cited

U.S. PATENT DOCUMENTS

| 7,984,263 | B2* | 7/2011 | Sathaye | G06F 12/10 711/138 |
| 2014/0040562 | A1* | 2/2014 | Koka | G06F 12/10 711/207 |
| 2014/0052917 | A1* | 2/2014 | Koka | G06F 12/1027 711/120 |
| 2016/0140048 | A1* | 5/2016 | Mukherjee | G06F 12/1027 711/135 |
| 2018/0150406 | A1* | 5/2018 | John | G06F 12/1063 |

* cited by examiner

*Primary Examiner* — Michael Krofcheck
(74) *Attorney, Agent, or Firm* — Greenberg Traurig, LLP

(57) ABSTRACT

The disclosed computer-implemented method for decentralized address translation can include receiving, by at least one processor implemented outside a processor core, a virtual address translation request. The method can additionally include, retrieving, by the at least one processor and in response to the virtual address translation request, a physical address. The method can also include returning, by the at least one processor, the physical address. Various other methods, systems, and computer-readable media are also disclosed.

20 Claims, 10 Drawing Sheets

SYSTEMS AND METHODS FOR DECENTRALIZED ADDRESS TRANSLATION

BACKGROUND

Virtual-to-physical address translation is an enabler for modern central processing units (CPUs). It allows program portability between different system configurations and allows running multiple programs safely on a single system. Under the hood, a process-specific virtual address (VA) is translated to the system-specific physical address (PA). Retrieving the mappings and storing them are operations of the translation.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
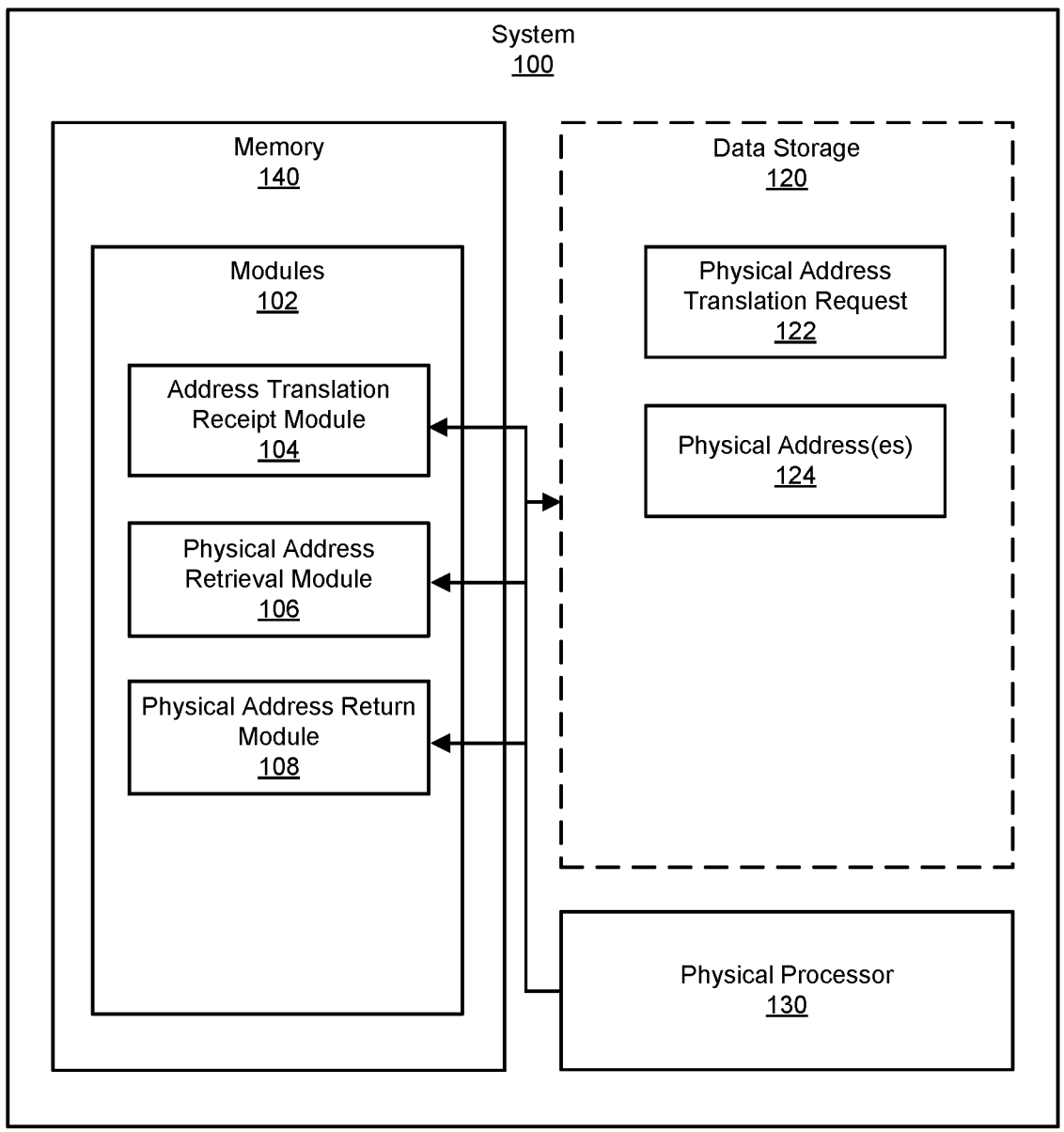
FIG. 1 is a block diagram of an example system for decentralized address translation.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for decentralized address translation. Traditionally, retrieving and storing virtual-to-physical address mapping has been performed by co-locating hardware components next to execution engines for fast access. The disclosed systems and methods implement a new structure that separates the storage and retrieval hardware components by storing the mappings in the core close to the engine for fast lookup, while retrieving the mappings outside the core.

The disclosed decentralized address translation structure provides numerous benefits. For example, implementing the address translation retrieval component outside the processor core reduces the worst-case stall latency of a page miss. This benefit manifests for applications with poor data locality by significantly reducing the average stall latency. An additional benefit is that implementing the address translation retrieval component outside the core allows update of the retrieval logic to maximize the performance of each device with different components outside the processor core (e.g., Level 3 (L3) cache) without modifying the processor core.

The term "execution engine," as used herein, can generally refer to a program that performs a core or essential function for other programs. For example, and without limitation, an execution engine can be used in operating systems, subsystems, or application programs to coordinate the overall operation of other programs.

In one example, a computing device can include processor circuitry including at least one processor core, memory circuitry implemented outside the at least one processor core and including one or more non-core portions of a cache hierarchy, and address translation circuitry including at least one retrieval component implemented outside the at least one processor core and configured to respond to a virtual address translation request by retrieving a physical address.

Another example can be the previously described computing device, wherein the address translation circuitry includes at least one storage component implemented inside the at least one processor core and the at least one retrieval component is configured to receive the virtual address translation request from the at least one storage component and return the physical address to the at least one storage component Another example can be the computing device of any of the previously described computing devices, wherein the at least one storage component includes a translation lookaside buffer.

Another example can be the computing device of any of the previously described computing devices, wherein the at least one retrieval component includes at least one page table walker.

Another example can be the computing device of any of the previously described computing devices, wherein the memory circuitry includes a memory, and the one or more non-core portions of the cache hierarchy are implemented between the at least one processor core and the memory.

Another example can be the computing device of any of the previously described computing devices, further comprising a switch responsive to the processor circuitry and configured to implement the at least one retrieval component by at least one of including the at least one page table walker between the at least one processor core and the one or more non-core portions of the cache hierarchy or including the at least one page table walker between the one or more non-core portions of the cache hierarchy and the memory.

Another example can be the computing device of any of the previously described computing devices, wherein the processor circuitry includes a plurality of processor cores, the at least one storage component includes a plurality of translation lookaside buffers implemented inside the plurality of processor cores, and the at least one retrieval component includes a plurality of page table walkers having a common structure and implemented outside the plurality of processor cores.

Another example can be the computing device of any of the previously described computing devices, wherein the at least one storage component is configured to communicate with the at least one retrieval component over a communication channel implemented between the at least one storage component and at least one of the one or more non-core portions of the cache hierarchy or a memory.

Another example can be the computing device of any of the previously described computing devices, wherein the at least one storage component is configured to communicate with the at least one retrieval component over a dedicated communication channel implemented in parallel to an additional communication channel implemented between the at least one storage component and at least one of the one or more non-core portions of the cache hierarchy or a memory.

Another example can be the computing device of any of the previously described computing devices, wherein the at least one retrieval component includes at least one page table walker.

Another example can be the computing device of any of the previously described computing devices, wherein the at least one retrieval component includes a translation lookaside buffer.

Another example can be the computing device of any of the previously described computing devices, wherein the at least one retrieval component includes a page table walker prefetcher.

Another example can be the computing device of any of the previously described computing devices, further comprising a switch responsive to the processor circuitry and configured to implement the at least one retrieval component by at least one of including the at least one retrieval component between the at least one processor core and the one or more non-core portions of the cache hierarchy or including the at least one retrieval component between the one or more non-core portions of the cache hierarchy and the memory.

In one example, a system can include at least one physical processor implemented outside of a processor core and physical memory comprising computer-executable instructions that, when executed by the physical processor, cause the physical processor to receive a virtual address translation request, retrieve a physical address in response to the virtual address translation request, and return the physical address.

Another example can be the system of the previously described example system, wherein the computer-executable instructions further cause the at least one physical processor to receive the virtual address translation request from at least one storage component implemented inside the processor core, and the at least one storage component includes a translation lookaside buffer.

Another example can be the system of any of the previously described example systems, wherein the at least one physical processor implements at least one page table walker that receives the virtual address translation request and retrieves and returns the physical address to the at least one storage component.

Another example can be the system of any of the previously described example systems, wherein the at least one physical processor implements an additional translation lookaside buffer.

Another example can be the system of any of the previously described example systems, wherein the at least one physical processor implements a page table walker prefetcher that anticipates an additional virtual address translation request based on a pattern exhibited by a plurality of received virtual address translation requests.

Another example can be the system of any of the previously described example systems, wherein the computer-executable instructions further cause the at least one physical processor to respond to the processor core by implementing the at least one page table walker by including the at least one page table walker between the processor core and one or more non-core portions of a cache hierarchy or including the at least one page table walker between the one or more non-core portions of the cache hierarchy and a memory.

In one example, a computer-implemented method can include receiving, by at least one processor implemented outside a processor core, a virtual address translation request, retrieving, by the at least one processor and in response to the virtual address translation request, a physical address, and returning, by the at least one processor, the physical address.

The following will provide, with reference to FIG. 1, detailed descriptions of example systems for decentralized address translation. Detailed descriptions of corresponding computer-implemented methods will also be provided in connection with FIG. 2. In addition, detailed descriptions of example address translation circuitry will be provided in connection with FIG. 3. Further, detailed descriptions of example virtual-to-physical address mapping will be provided in connection with FIG. 4. Further, detailed descriptions of example implementations of address translation circuitry will be provided in connection with FIGS. 5 and 6. Further, detailed descriptions of example retrieval methods carried out by address translation circuitry will be provided in connection with FIG. 7. Further, detailed descriptions of example logical implementations of decentralized address translation will be provided in connection with FIG. 8. Further, detailed descriptions of an example logical implementation of decentralized address translation with switching capability will be provided in connection with FIG. 9. Finally, detailed descriptions of an example physical implementation of decentralized address translation with retrieval components that have a common structure will be provided in connection with FIG. 10.

FIG. 1 is a block diagram of an example system 100 for decentralized address translation. As illustrated in this figure, example system 100 can include one or more modules 102 for performing one or more tasks. As will be explained in greater detail below, modules 102 can include an address translation request receipt module 104, a physical address retrieval module 106, and a physical address return module 108. Although illustrated as separate elements, one or more of modules 102 in FIG. 1 can represent portions of a single module or application.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices. One or more of modules 102 in FIG. 1 can also represent all or portions of one or more special-purpose computers configured to perform one or more tasks.

As illustrated in FIG. 1, example system 100 can also include one or more memory devices, such as memory 140. The term "memory," as used herein, can generally refer to any computer hardware capable of storing and/or transforming information. For example, and without limitation, a memory can correspond to hardware, software, or combinations thereof. In turn, hardware can correspond to analog circuitry, digital circuitry, communication media, or combinations thereof. Although depicted as separate from processor 130, memory 140 can be an internal memory of processor 130, a memory external to processor 130, or combinations thereof.

In certain implementations, memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130, that can be located outside of a processor core. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate decentralized address translation. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 can include stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, physical address translation request 122 and physical address(es) 124.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 2:
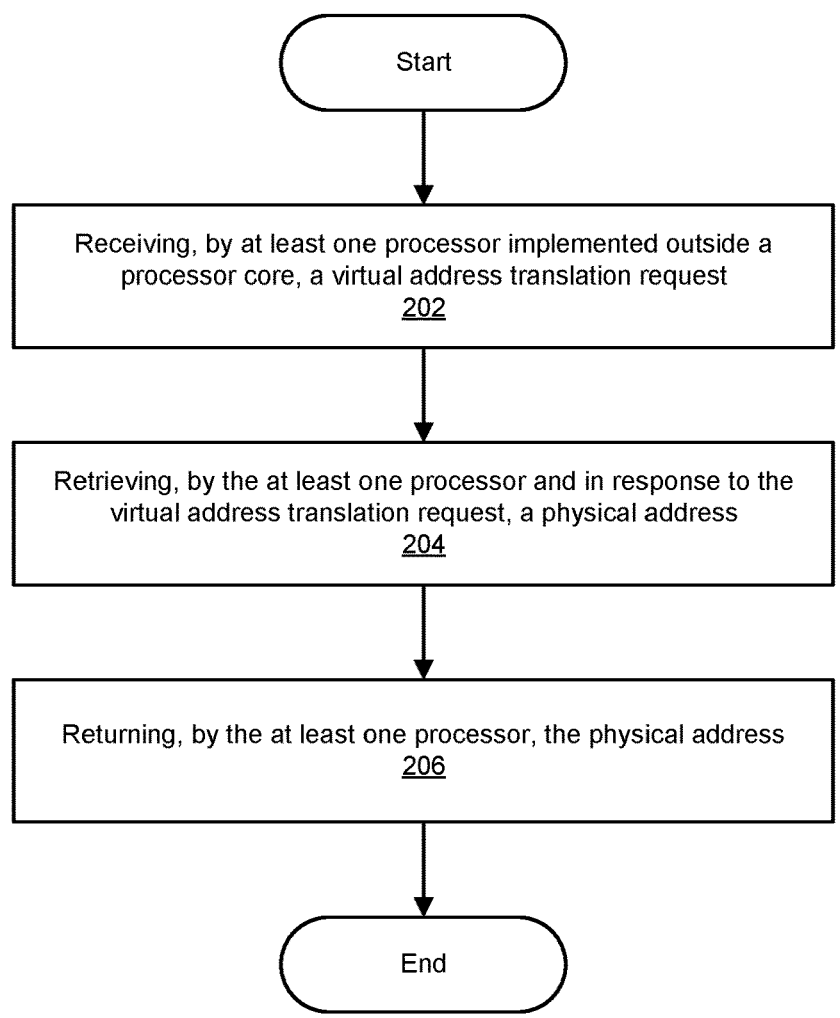
FIG. 2 is a flow diagram of an example method for decentralized address translation.

FIG. 2 is a flow diagram of an example computer-implemented method 200 for decentralized address translation. The steps shown in FIG. 2 can be performed by any suitable hardware, computer-executable code, and/or computing system, including system 100 in FIG. 1. In one example, each of the steps shown in FIG. 2 can represent an algorithm whose structure includes and/or is represented by multiple sub-steps, examples of which will be provided in greater detail below.

As illustrated in FIG. 2, at step 202 one or more of the systems described herein can receive a request. For example, physical processor 130 can be implemented outside a processor core and, as part of system 100 in FIG. 1, receive a virtual address translation request.

The term "virtual address translation request," as used herein, can generally refer to a request to find out which physical page maps to which virtual page. For example, and without limitation, a virtual address translation request can include a virtual address or portion thereof. A virtual address can be a binary number in virtual memory that enables a process to use a location in primary storage (e.g., main memory) independently of other processes and to use more space than exists in primary storage by temporarily relegating some contents to a hard disk or internal flash drive. A virtual address can have two parts, a page number and an offset into that page. A portion of a virtual address can correspond to a page number, an offset, a portion of the offset, etc.

The term "processor core," as used herein, can generally refer to a processing unit that reads instructions to perform specific actions. Examples of processor cores can include, without limitation, an individual processing unit within a computer's central processing unit (CPU), an individual processing unit that receives instructions from a single computing task, working with the clock speed to quickly process this information and temporarily store it in the Random Access Memory (RAM), etc.

The systems described herein can perform step 202 in a variety of ways. In one example, the address translation circuitry can include at least one storage component implemented inside the at least one processor core and the at least one retrieval component can be configured to receive the virtual address translation request from the at least one storage component and return the physical address to the at least one storage component. In some examples, the at least one storage component can include a translation lookaside buffer, and physical processor 130 can, as part of system 100 in FIG. 1, receive the virtual address translation request from the translation lookaside buffer implemented inside the processor core. Additionally or alternatively, the at least one storage component can include at least one missing address buffer. Additionally or alternatively, the physical processor 130 can be at least part of at least one retrieval component that includes at least one page table walker. In some of these examples, the page table walker can receive the virtual address translation request from the at least one storage component implemented inside the processor core. Additionally or alternatively, the at least one retrieval component can further include an additional translation lookaside buffer. In some of these examples, the page table walker can receive the virtual address translation request indirectly through the additional translation lookaside buffer. In some examples, the address translation request can be a request that includes at least a portion of a virtual address. In some examples, physical processor 130 can receive the address translation request over a communication channel implemented between the at least one storage component and a cache hierarchy and/or memory. In other examples, physical processor 130 can receive the address translation request over a dedicated communication channel (e.g., bus) implemented in parallel to an additional communication channel implemented between the at least one storage component and a cache hierarchy and/or a memory.

The term "storage component," as used herein, can generally refer to a memory buffer and/or memory buffer controller. Example storage components can include, for example, one or more translation lookaside buffers, one or more missing address buffers, etc.

The term "translation lookaside buffer," as used herein, can generally refer to a memory cache that stores the recent translations of virtual memory to physical memory. For example, and without limitation, a translation lookaside buffer (TLB) can correspond to an address-translation cache, a data translation lookaside buffer (DTLB), a code translation lookaside buffer (ITLB), a shared translation lookaside buffer (STLB), etc. A TLB can be used to reduce the time taken to access a user memory location.

The term "cache hierarchy," as used herein, can generally refer to one or more hierarchical levels of cache memory. For example, and without limitation, cache hierarchy can refer to L1, L2, and L3 cache. L1 cache is normally located inside a processor core and L3 cache is normally located outside a processor core. Depending on implementation, L2 cache can be located inside and/or outside a processor core. In this context, one or more non-core portions of a cache hierarchy can refer to L3 cache and, in some implementations L2 cache or portions thereof. L4 cache is less often used, but can be implemented as a victim cache for the L3 cache.

At step 204 one or more of the systems described herein can retrieve a physical address. For example, physical processor 130 can, as part of system 100 in FIG. 1, respond to the virtual address translation request by retrieving a physical address.

The term "physical address," as used herein, can generally refer to an address or location of data storage. For example, and without limitation, a physical address can be a memory address that is represented in the form of a binary number on address bus circuitry to enable a data bus to access a particular storage cell of main memory, or a register of a memory-mapped I/O device.

The systems described herein can perform step 204 in a variety of ways. In one example, the retrieval component can include a page table walker that can retrieve the physical address from the one or more page tables. Additionally or alternatively, the retrieval component can include a page table walker and a page walker cache, and the physical processor 130 can retrieve the physical address from the page walker cache. In some of these examples, the at least one retrieval component can further include a page table walker prefetcher that recognizes retrieval patterns, anticipates physical address requests, and causes retrieval of corresponding physical addresses ahead of the request receipt so that they can be available (e.g., entered in the additional TLB, the one or more page tables, and/or the page walker cache) before receipt of the request by physical processor 130. Additionally or alternatively, the at least one retrieval component can further include an additional translation lookaside buffer with or without an additional missing address buffer, and the physical processor 130 can retrieve the physical address from the additional translation lookaside buffer and/or missing address buffer. Additionally or alternatively, physical processor 130 can retrieve the physical address from a level (e.g., last level) of cache of a cache hierarchy (e.g., L3 cache) that can be an inclusive or exclusive level of cache. Additionally or alternatively, physical processor 130 can retrieve the physical address from a memory that can correspond to a main memory.

At step 206 one or more of the systems described herein can return the physical address. For example, physical processor 130 can, as part of system 100 in FIG. 1, return the physical address to the at least one storage component implemented inside the processor core.

The systems described herein can perform step 206 in a variety of ways. In one example, physical processor 130 can return the physical address over a communication channel implemented between the at least one storage component and a cache hierarchy and/or memory. In other examples, physical processor 130 can return the physical address over a dedicated communication channel (e.g., bus) implemented in parallel to an additional communication channel implemented between the at least one storage component and a cache hierarchy and/or a memory.

In some examples, steps 202-206 can occur in response to a switch. For example, one or more non-core portions of the cache hierarchy can be implemented between the at least one processor core and a memory (e.g., primary storage, main memory, etc.) In some of these examples, the switch can be responsive to the processor core (operating system) and configured to at least one of statically or dynamically implement the retrieval component by including the retrieval component between the processor core and a cache hierarchy. Additionally or alternatively, the switch can be responsive to the processor core (e.g., operating system) and configured to at least one of statically or dynamically implement the retrieval component by including the retrieval component between the cache hierarchy and the memory. In some examples, the switch may correspond to a conflict control register that logically repositions the retrieval component in a signal chain before and/or after L3 cache. In some examples, the processor core can reposition the retrieval component, measure retrieval latency, and develop policies for switching the position of the retrieval component (e.g., on a per thread basis). In some examples, the processor core can reposition the retrieval component based on one or more settings and/or policies defined by an empowered user (e.g., system administrator).

In some examples, steps 202-206 can be carried out (e.g., in parallel) in response to multiple address translation requests received (e.g., in parallel) from multiple processor cores. For example, the at least one storage component can include a plurality of translation lookaside buffers implemented inside a plurality of processor cores, and processor 130 can be implemented with a plurality of retrieval components that include a plurality of page table walkers having a common structure and implemented outside the plurality of processor cores. In some examples, the common structure facilitates update of the plurality of retrieval components. In some examples, the common structure enables shared retrieval components, such as a shared additional translation lookaside buffer, a shared page table, a shared page walker cache, and/or a shared prefetcher. In some examples, prefetching can be improved by recognizing physical address retrieval patterns exhibited across multiple page table walkers retrieving physical addresses for different processor cores cooperating to execute related threads in a virtual environment.

As mentioned previously, virtual-to-physical address translation is an enabler for modern central processing units (CPUs). It allows program portability between different system configurations and allows running multiple programs safely on a single system. Under the hood, a process-specific virtual address (VA) is translated to the system-specific physical address (PA). Retrieving the mappings and storing them are operations of the translation.

Figure 3:
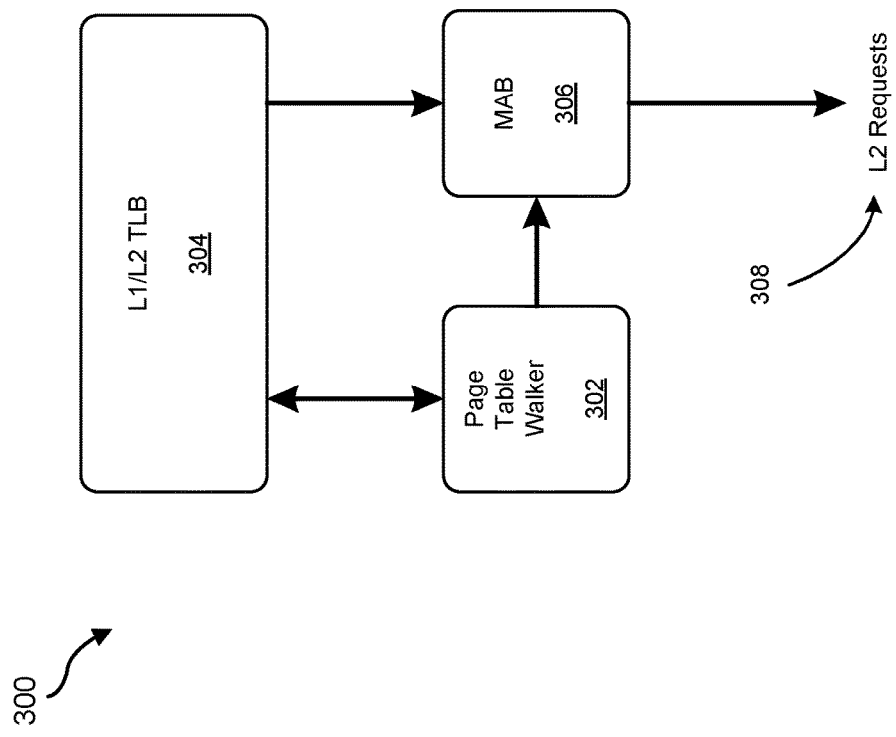
FIG. 3 is a block diagram illustrating example address translation circuitry.

Referring to FIG. 3, virtual-to-physical address translation is performed by address translation circuitry 300. Retrieving each mapping from a memory page in a VA space to that of the PA space can be performed by a page table walker (PTW) 302 and the acquired mapping can be stored in a translation look-aside buffer (TLB) 304. The PTW 302 can connect to a TLB 304 and L2 cache through a missing address buffer (MAB) 306. The complete mapping can be constructed and stored on the memory by the operating system (OS) using a radix tree to reduce the memory requirement. The PTW 302 can access page table entries through a cache hierarchy by issuing requests 308 at L2 cache.

Figure 4:
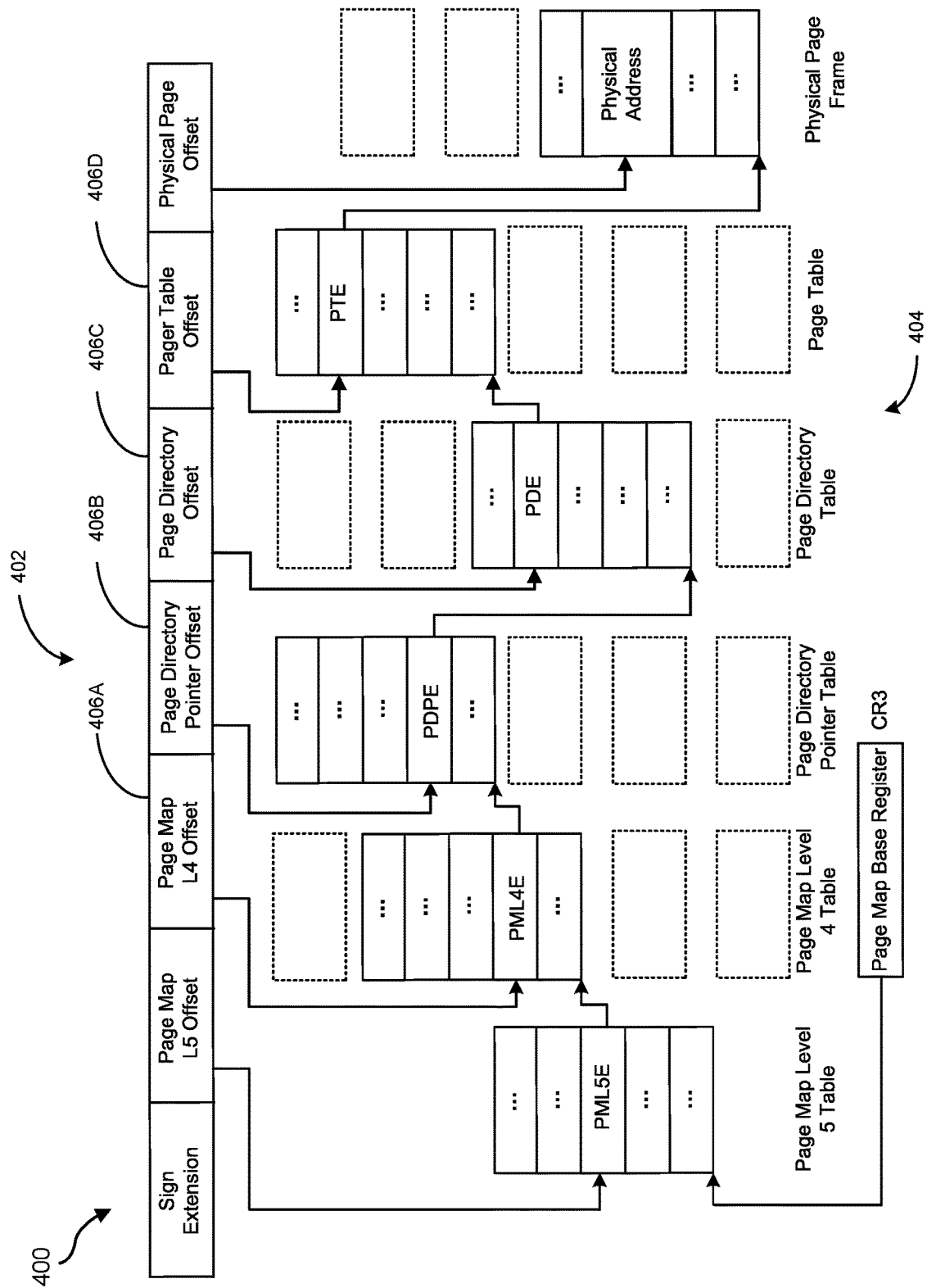
FIG. 4 is a block diagram illustrating example virtual-to-physical address mapping.

Referring to FIG. 4, the retrieval part of virtual to physical address mapping 400 can be an iterative process to obtain the mapping from the memory when the required mapping is not in the TLB. Upon a TLB miss, the PTW can iteratively take a portion of the virtual address 402 and traverse the radix tree 404. It can take four memory requests using four sections of VA 406A-406D through the cache hierarchy and these requests can be used to find one mapping. The discovered mappings can be cached in usually two levels of TLBs. Due to a limited TLB capacity, some mappings that might be used later can be discarded to make room for mappings of newly seen pages. Thus, the retrieval process can be performed not only for a never-before-seen page, but also for long-seen pages.

Several techniques can be used to mitigate the effect of high latency for retrieval, which can take many cycles. As previously mentioned, the PTW can access page table entries through the cache hierarchy by issuing requests at L2 cache. Page entries tend to have larger reuse distances than data. Thus, the read page entries often do not stay in the cache long enough to be present when they are needed again. As a result, the execution units can stall to wait for the mapping to be retrieved from the main memory. Employing out-of-order execution and using multiple execution units can assist in hiding the stall waiting for the translation and for memory access in general. In short, these techniques do not reduce the worst-case latency of retrieval but try to hide it instead.

To reduce the average latency of mapping retrieval, high performance CPUs can employ a separate cache, namely Page Walk Cache (PWC), for intermediate data within a walk. Even with PWC, the number of possible pages and intermediate data can still be larger than the PWC capacity. Thus, reading intermediate data from the main memory is inevitable. Consequently, despite employing PWC, the worst-case latency remains the same. For applications with poor memory access locality, the frequency of encountering the worst-case latency increases. As a result, the worst-case latency becomes the driving component of the high average latency. Reducing the worst-case latency can directly reduce the average latency for these applications.

Figure 5:
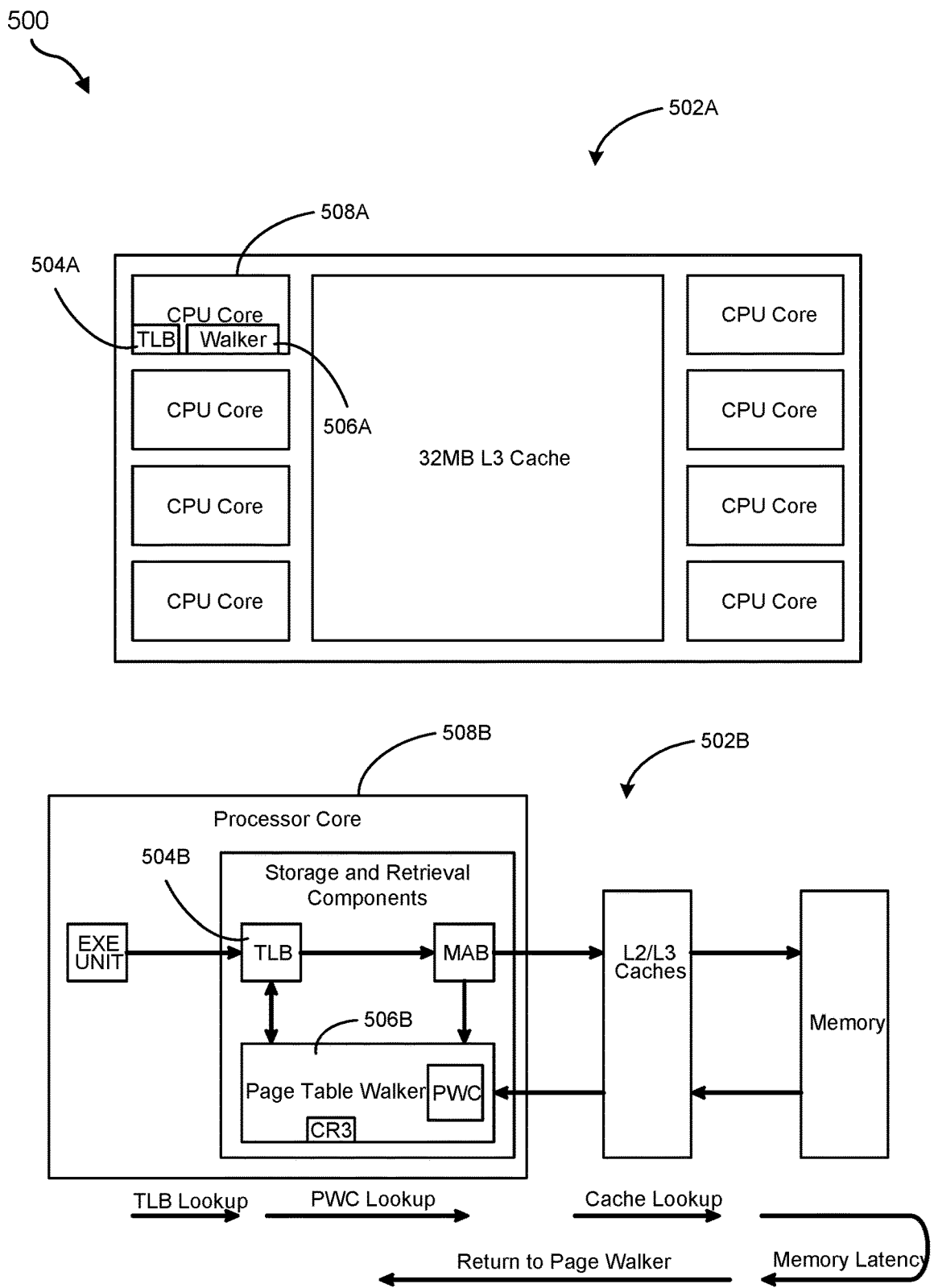
FIG. 5 is a block diagram illustrating example physical and logical implementations of centralized address translation circuitry.

Referring to FIG. 5, example implementations 500 of address translation circuitry are shown, including a physical implementation 502A and a logical implementation 502B. In example implementations 500 the TLB 504A and 504B and PTW 506A and 506B are co-located and tightly connected to the processor core 508A and 508B. Using larger pages reduces the number of translations, but the same problem remains. It can reduce the frequency of the worst-case latencies. However, as the cache capacity becomes much larger (e.g., through stacked L3 caching technology) than what the processor core 508A and 508B was originally designed for, the TLBs 504A and 504B and PWC become under-sized. As a result, the data-hit, but page-miss phenomenon will happen for applications with low data locality. Thus, applications with poor memory access locality would not benefit much by stacked L3 caching because the translation structure was designed to support a smaller number of active pages. As a result, it cannot handle the many mappings needed by these applications running on a device with stacked L3 caching. The problem becomes more severe on systems with virtualization. To let a guest OS handle the translation without the host OS intervention, the translation needs more memory accesses. Such a mechanism requires up to twenty-four memory requests. As a result, the worst-case latency is much higher in such systems.

Figure 6:
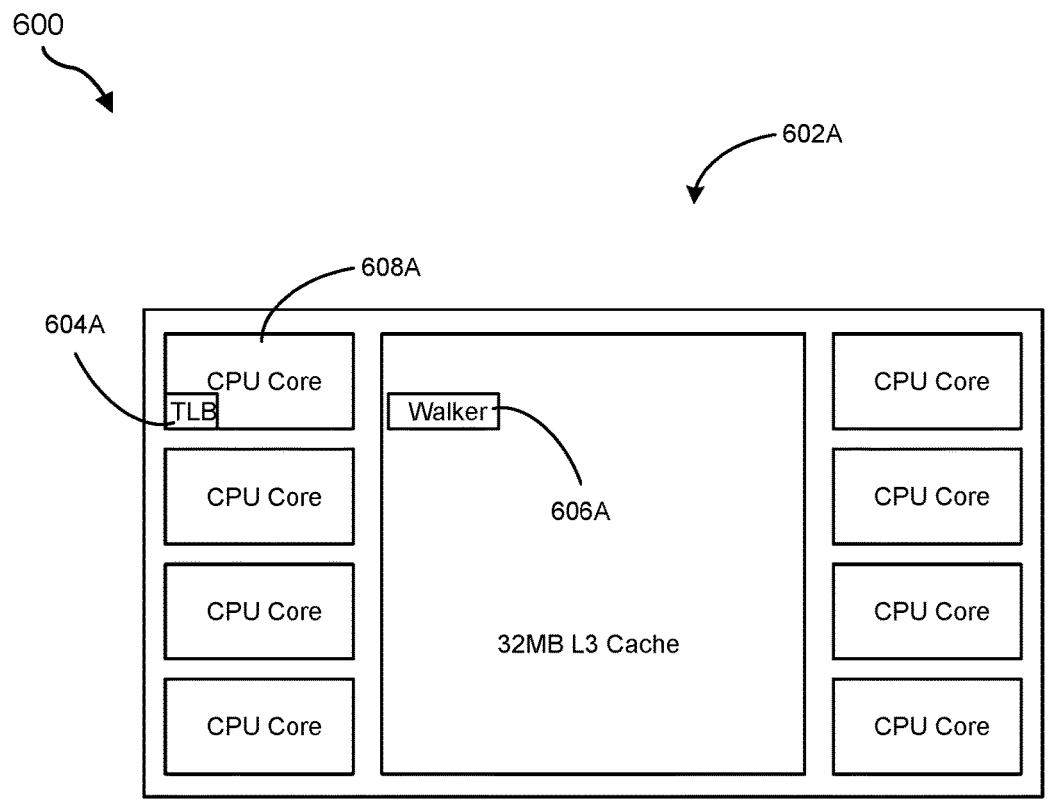
FIG. 6 is a block diagram illustrating example physical and logical implementations of decentralized address translation circuitry.
Figure 6:
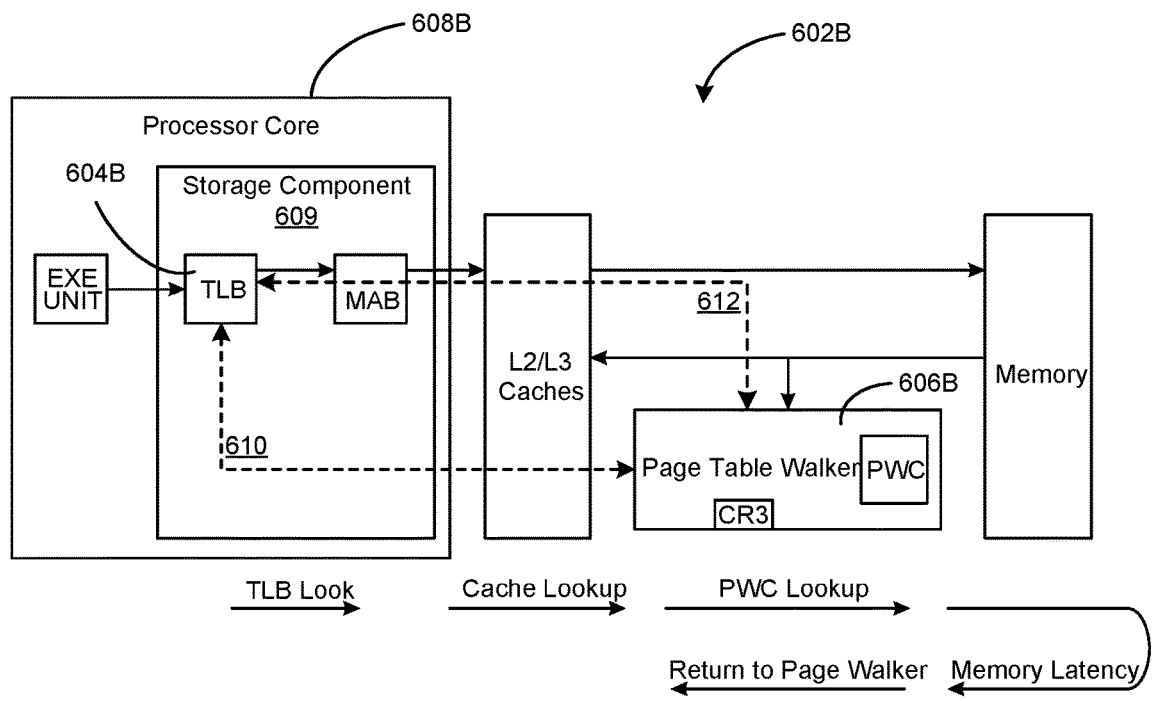

Referring to FIG. 6, example implementations 600 of decentralized address translation circuitry are shown, including a physical implementation 602A and a logical implementation 602B. In example implementations 600, the TLB 604A and 604B and PTW 606A and 606B are not co-located. Rather, the TLB 604A and 604B is a storage component 609 located inside the processor core 608A and 608B and the PTW 606A and 606B is a retrieval component implemented outside the processor core 608A and 608B.

A distinct feature of this disclosed structure is that the retrieval (e.g., PTW) and the storage (e.g., TLB) of the mapping are separated both logically and physically. The two components can communicate through a dedicated channel 610 or an existing data channel 612 in the cache hierarchy. The worst-case latency of the disclosed structure shown in FIG. 6 is much lower than that of the existing structure shown in FIG. 5. Conventionally, when the lookup of the VA page in the TLB, PWC, and cache hierarchy are misses (i.e., the worst case), the intermediate data must be fetched from memory through the cache hierarchy. In contrast, the worst case in the disclosed structure of FIG. 6 does not need to look up and to fill in the cache hierarchy, saving many cycles of latency. In an example scenario, the tag latency (i.e., the number of cycles to look up to see if there is a match) of L2 and L3 can be about 4 and 12 cycles, respectively. Therefore, 4×16=64 cycles can be removed from the worst-case. In the system with virtualization, the saving becomes 24×16=384 cycles. Even when the number of pipelines in the communication channel between the two components is considered, the amount of latency reduction remains substantial.

This benefit is also applicable to victim (i.e., exclusive) L3 cache. For such a cache hierarchy, L3 still needs to be looked up after an L2 miss. The main difference is that only L2 is filled, but not L3. The benefit computed above does not account for the latency reduction due to filing. As a result, the benefit of the new structure can still be high.

Figure 7:
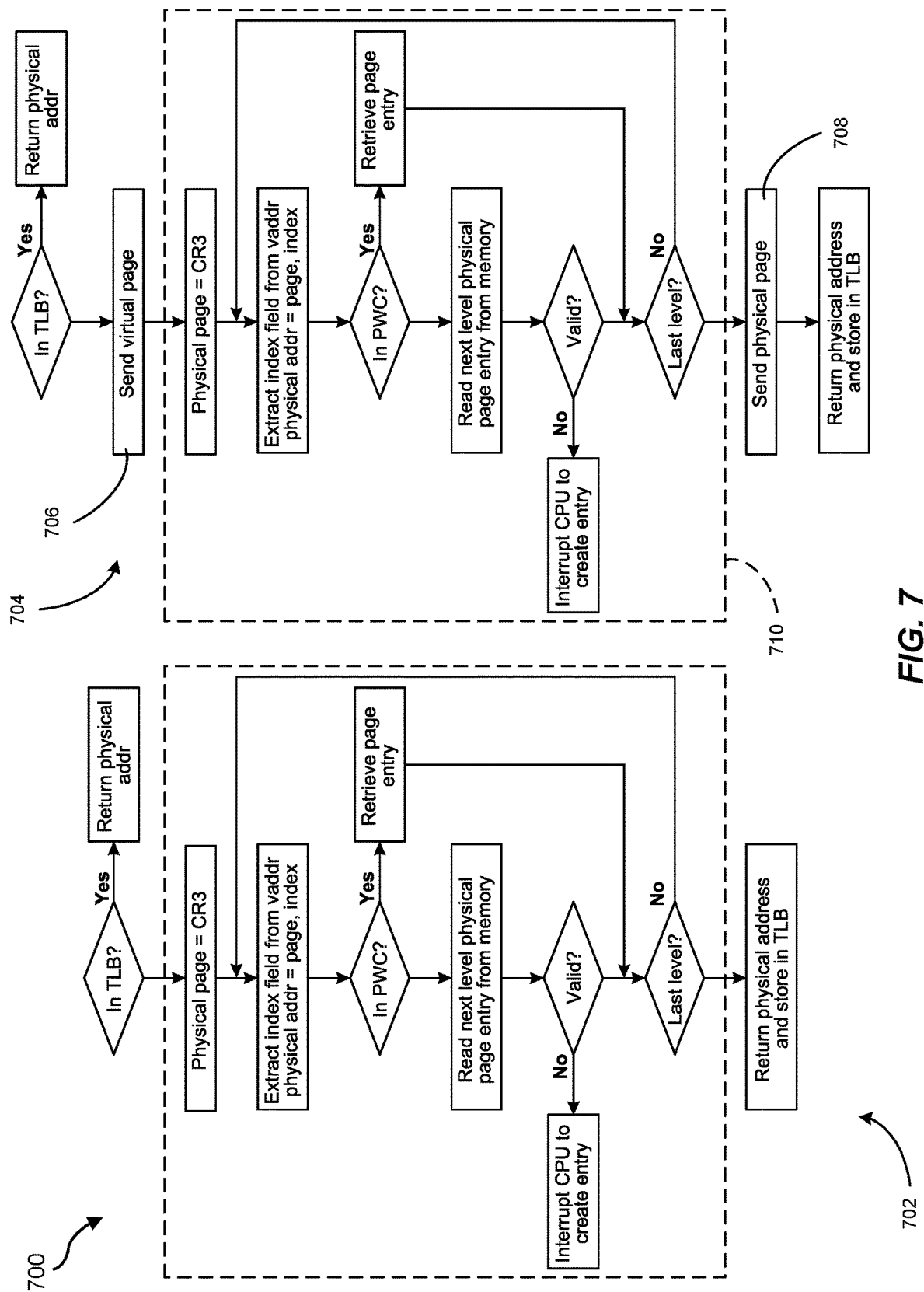
FIG. 7 is a flow diagram illustrating example retrieval methods carried out by address translation circuitry.

Referring to FIG. 7, example retrieval methods 700 carried out by address translation circuitry are shown, including the operation 702 of the existing structure compared to operation 704 of the disclosed structure. As shown, the retrieval and storage operational components of operation 702 and 704 can be the same or similar, but the operation 704 of the disclosed structure includes steps 706 and 708. At step 706, the storage component can send a virtual page address to the retrieval component. At step 708, the retrieval component can, following retrieval of a physical page at step 710, send the physical page to the storage component. The general performance comparison is shown in Table 1.

TABLE 1

| TLB | PWC | CACHE | Benefit | Remedy |
| --- | --- | --- | --- | --- |
| Hit | – | – | same | |
| Miss | Hit | – | – | Increase TLB size |
| | Miss | Hit | – | Page walker before L3 Cache |
| | | Miss | ++ | |

The differentiating factor of the disclosed structure is that the mapping retrieval component (e.g., PTW) is not co-located with the mapping storage component (e.g., TLB). Thus, the TLB controller can communicate to the PTW to start page walks and to acquire the mapping. The best-case latency (i.e., TLB hit) is the same in both structures. By having the walker close to memory, the worst-case latency (i.e., last row of Table 1) significantly improves, as shown above. For other cases, there are some possible optimizations. When the lookup misses in TLB, but hits in PWC, the new structure can suffer some latency penalties for communication between the two components. This small overhead can be remedied by increasing the size of the TLB (e.g., using the vacant area in the processor core due to relocation of the PTW and PWC). In effect, this TLB size increase can reduce the frequency of such cases. The disclosed structure can operate PTWs in front of the memory for minimizing the worst-case latency. As a result, it cannot take advantage of the cache hierarchy. For an application with good data locality, this can be a common case. To reduce the negative impact on such applications, the PTW can be located in front of the last level cache instead. In this case, some worst-case latency gain is reduced in order to improve the average latency of an application with high data locality. The new structure with such remedies can still reduce the worst-case latency, while remain competitive in other cases. As a result, the average latency of an application with poor memory access locality (e.g., where the worst-case happens often) improves, while still maintaining the average latency of well-behaved applications.

As an added benefit of the new structure, the PTW and PWC can be implemented with architecture selected along with each variation of the uncore components. For example, the number of PTWs and the PWC size can be varied for each variation independently from the TLBs in the processor core. Therefore, the full benefit of each cache hierarchy variation can be realized without modifying the core. This capability can be beneficial because each CPU generation can feature several devices that share a same core design, but that exhibit some variations of L3 caches and target different use cases.

Figure 8:
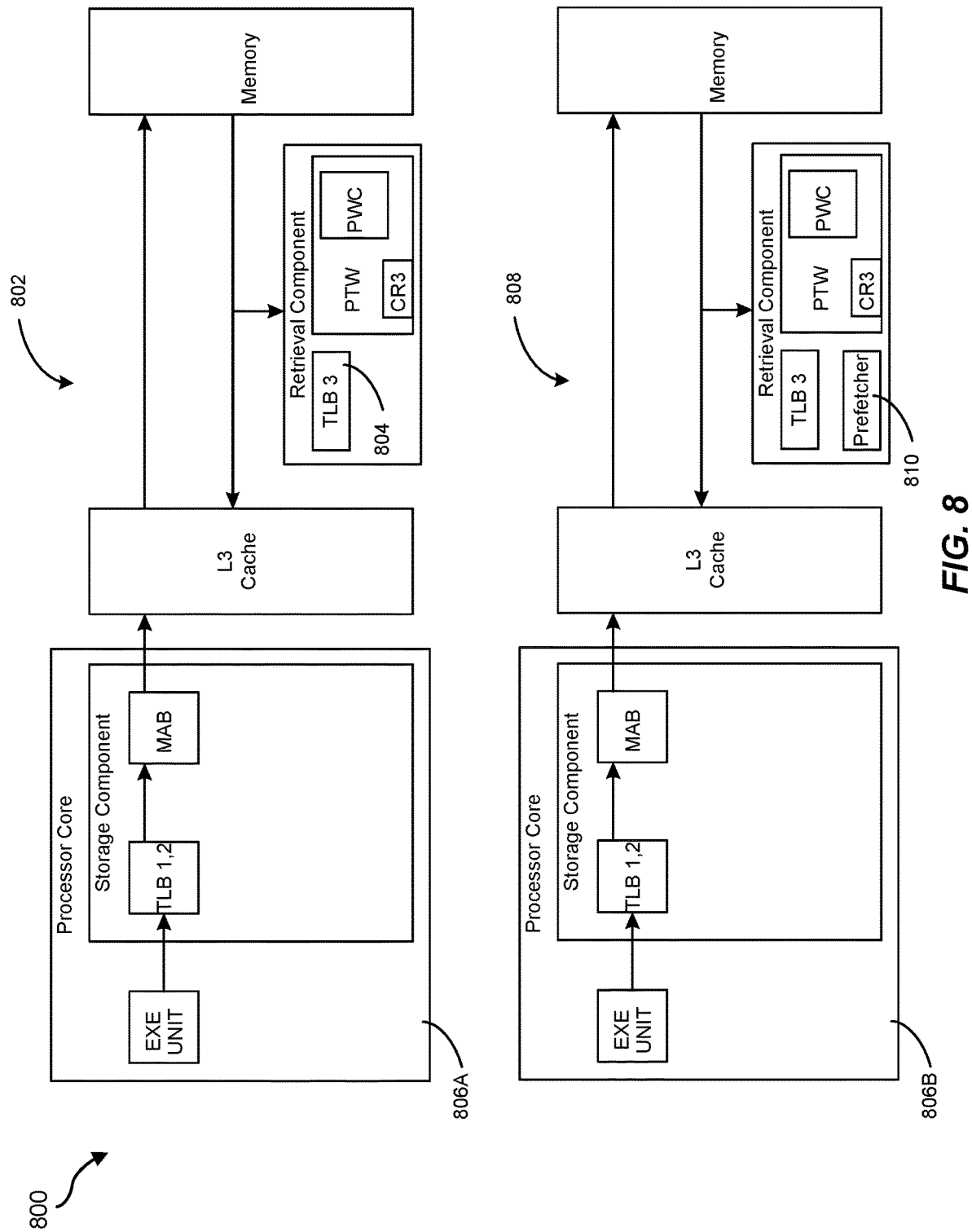
FIG. 8 is a block diagram illustrating example logical implementations of decentralized address translation.

Referring to FIG. 8, example logical implementations 800 of decentralized address translation are shown, including an implementation 802 that includes an additional TLB 804 located outside the processor core 806A and an implementation 808 that further includes a PTW prefetcher 810 located outside the processor core 806B. Multiple TLBs are commonly implemented in today's processor cores, so there can be TLBs for L1 and L2 cache inside the processor core, but a third TLB for L3 cache can be moved outside the processor core and co-located with the PTW as the additional TLB 804. Meanwhile PTW prefetcher 810 can recognize retrieval patterns, anticipate future requests, and retrieve physical addresses ahead of time.

Figure 9:
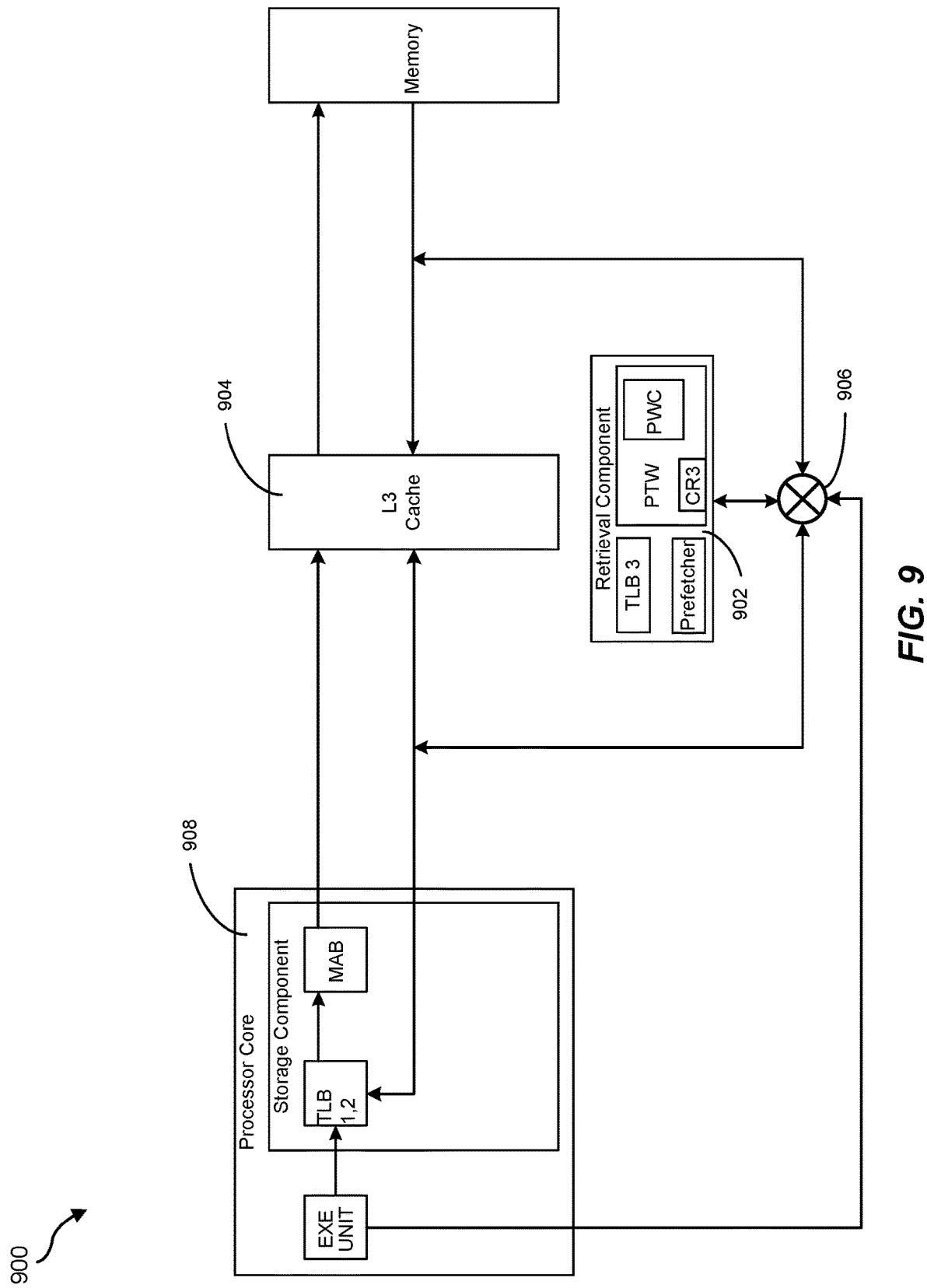
FIG. 9 is a block diagram illustrating an example logical implementation of decentralized address translation with switching capability.

Referring to FIG. 9, an example logical implementation 900 of decentralized address translation with at least one of static or dynamic switching capability is shown. As indicated, the retrieval component 902 can be placed in front of L3 cache 904 instead of after the L3 cache 904. With this placement, the worst-case latency saving can be approximately 16 and 96 cycles. Doing so can reduce latency for retrieval of intermediate data residing in the cache hierarchy. Due to large reuse distance, the intermediate data can most likely reside in L3 cache, but not L2 cache.

A switch 906 can be implemented to change the connection of the retrieval logic statically or dynamically between before and after L3 Cache 904. Thanks to the separate structures, this static or dynamic switching can be performed without changing the processor core. In some examples, the connection can be under control of the OS to allow different connections for different applications running on the processor core 908. In such situations, retrieval component 902 can communicate to one or more storage components and one or more memory components through either one of the connection points. When loading and/or unloading an application, the OS can configure the retrieval component 902 to recognize and differentiate the communications. Another variation can be to have the switching logic observe a flag bit, set by the TLB under direction of the OS.

It is possible that some implementations cannot afford this small addition. An alternative is to have a small component near the TLB to issue uncacheable read requests from the specific physical address. The PTW can start the retrieval process when it receives the read request and send the mapping back. The physical address used in this communication can be unused by the system and can be set by the OS along with control register 3 (CR3) at the TLB controller and PTW. Also, buffers can be added to either side of the channel. One possibility is to add a buffer, like miss status/handle registers (MSHR), on the TLB side to allow out-of-order mapping returned from the retrieval component 902.

Figure 10:
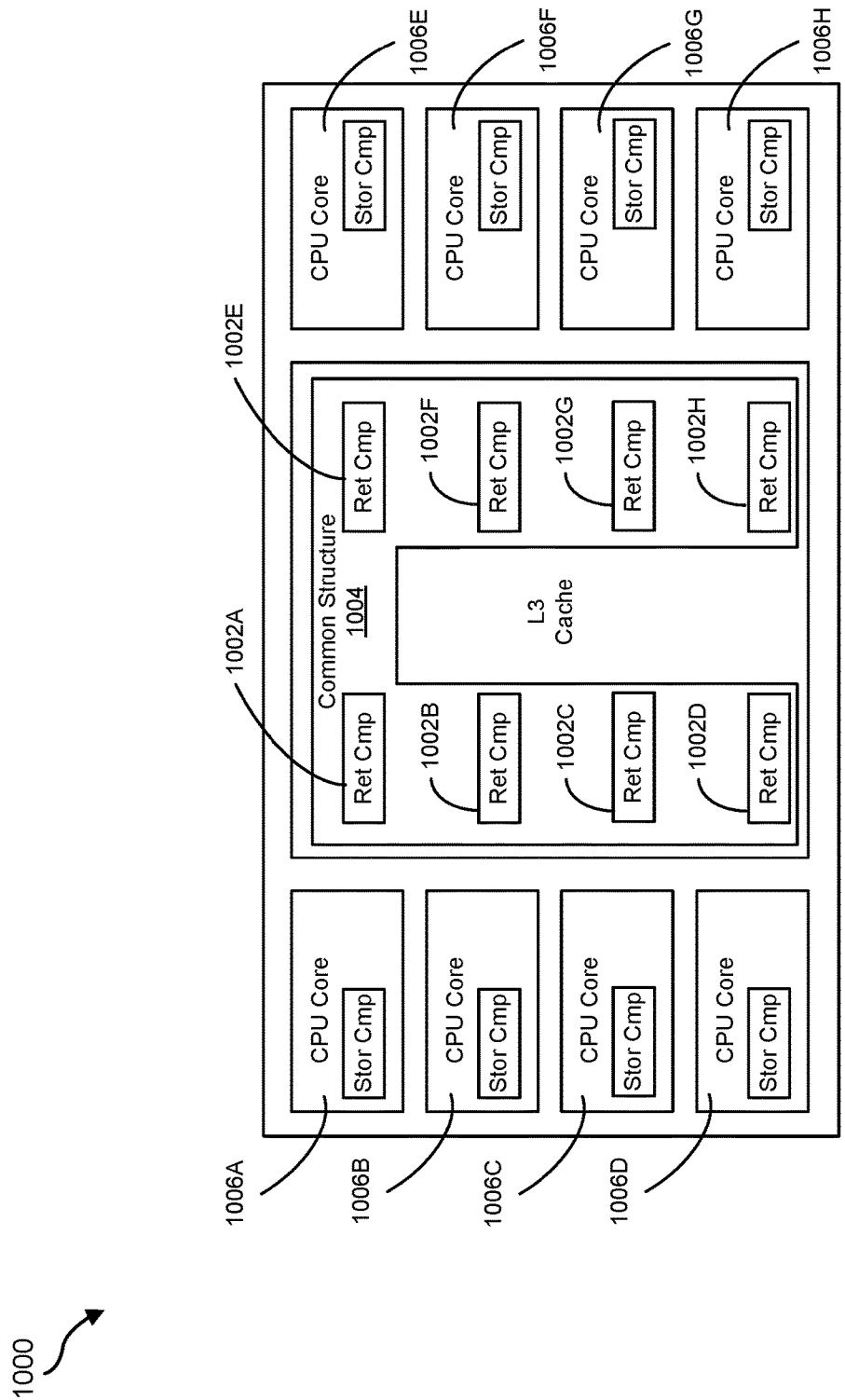
FIG. 10 is a block diagram illustrating an example physical implementation of decentralized address translation with retrieval components that have a common structure.

Referring to FIG. 10, an example physical implementation 1000 of decentralized address translation with retrieval components 1002A-1002H that have a common structure 1004 is shown. As mentioned above, the common structure 1004 can facilitate update of the plurality of retrieval components. Alternatively or additionally, the common structure 1004 can enable shared retrieval components, such as a shared additional translation lookaside buffer, a shared page table, a shared page walker cache, and/or a shared prefetcher. In some examples, prefetching performed by a shared prefetcher can be improved by recognizing physical address retrieval patterns exhibited across multiple retrieval components 1002A-1002H retrieving physical addresses for different processor cores 1006A-1006H cooperating to execute related threads in a virtual environment.

As set forth above, the disclosed systems and methods implement a new address translation structure that separates the storage and retrieval hardware components by storing the mappings in the core close to the execution engine for fast lookup, while retrieving the mappings outside the core. The disclosed structure provides at least two benefits. For example, the disclosed structure can reduce the worst-case latency of mapping retrieval. This reduction can be used to improve the performance of the CPU and/or reduce the aggressiveness of other optimizations implemented to mitigate the otherwise high worst-case latency. Also, the disclosed structure decouples the two operations needed for virtual address to physical address mapping. This decoupling allows update of mapping retrieval logic suitable for each device variation without changing the processor core. For example, the PWC capacity can be adjusted when changing L3 cache size or target performance. Also, static or dynamic switching can be implemented that changes the location of the retrieval component with respect to the last level of cache in the cache hierarchy.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:
    processor circuitry including at least one processor core;
    memory circuitry implemented outside the at least one processor core and including one or more non-core portions of a cache hierarchy; and
    address translation circuitry including at least one retrieval component implemented outside the at least one processor core and configured to respond to a virtual address translation request by retrieving a physical address,
    wherein the computing device is configurable to implement the at least one retrieval component between the one or more non-core portions of the cache hierarchy and a memory at least in part by switching a connection of the at least one retrieval component between a first connection and a second connection, wherein the first connection communicatively couples the at least one retrieval component between the at least one processor core and the one or more non-core portions of the cache hierarchy and the second connection communicatively couples the at least one retrieval component between the one or more non-core portions of the cache hierarchy and the memory.

2. The computing device of claim 1, wherein the address translation circuitry includes at least one storage component implemented inside the at least one processor core and the at least one retrieval component is configured to receive the virtual address translation request from the at least one storage component and return the physical address to the at least one storage component.

3. The computing device of claim 2, wherein the at least one storage component includes a translation lookaside buffer.

4. The computing device of claim 3, wherein the at least one retrieval component includes at least one page table walker.

5. The computing device of claim 4, wherein the memory circuitry includes the memory, and the one or more non-core portions of the cache hierarchy are implemented between the at least one processor core and the memory.

6. The computing device of claim 5, wherein:
the computing device is configurable to implement the at least one page table walker at the first connection or the second connection; and
the computing device further comprises a switch responsive to the processor circuitry and configured to switch a connection of the at least one page table walker between the first connection and the second connection.

7. The computing device of claim 2, wherein the processor circuitry includes a plurality of processor cores, the at least one storage component includes a plurality of translation lookaside buffers implemented inside the plurality of processor cores, and the at least one retrieval component includes a plurality of page table walkers having a common structure and implemented outside the plurality of processor cores.

8. The computing device of claim 2, wherein the at least one storage component is configured to communicate with the at least one retrieval component over a communication channel implemented between the at least one storage component and at least one of the one or more non-core portions of the cache hierarchy or the memory.

9. The computing device of claim 2, wherein the at least one storage component is configured to communicate with the at least one retrieval component over a dedicated communication channel implemented in parallel to an additional communication channel implemented between the at least one storage component and at least one of the one or more non-core portions of the cache hierarchy or the memory.

10. The computing device of claim 1, wherein the at least one retrieval component includes at least one page table walker.

11. The computing device of claim 1, wherein the at least one retrieval component includes a translation lookaside buffer.

12. The computing device of claim 1, wherein the at least one retrieval component includes a page table walker prefetcher.

13. The computing device of claim 1,
further comprising a-switch responsive to the processor circuitry and configured to switch the connection of the at least one retrieval component between
the first connection and
the second connection.

14. A system comprising:
at least one physical processor implemented outside of a processor core, wherein the system is configurable to implement the at least one physical processor between one or more non-core portions of a cache hierarchy and a memory at least in part by switching a connection of at least one retrieval component between a first connection and a second connection, wherein the first connection communicatively couples the at least one retrieval component between the processor core and the one or more non-core portions of the cache hierarchy and the second connection communicatively couples the at least one retrieval component between the one or more non-core portions of the cache hierarchy and the memory; and
physical memory comprising computer-executable instructions that, when executed by the at least one physical processor, cause the at least one physical processor to:
receive a virtual address translation request;
retrieve a physical address in response to the virtual address translation request; and
return the physical address.

15. The system of claim 14, wherein the computer-executable instructions further cause the at least one physical processor to receive the virtual address translation request from at least one storage component implemented inside the processor core, and the at least one storage component includes a translation lookaside buffer.

16. The system of claim 15, wherein the at least one physical processor implements at least one page table walker that receives the virtual address translation request and retrieves and returns the physical address to the at least one storage component.

17. The system of claim 16, wherein the at least one physical processor implements an additional translation lookaside buffer.

18. The system of claim 17, wherein the at least one physical processor implements a page table walker prefetcher that anticipates an additional virtual address translation request based on a pattern exhibited by a plurality of received virtual address translation requests.

19. The system of claim 18,
further comprising a-switch responsive to the processor core and configured to switch the connection of the at least one retrieval component between the first connection and the second connection.

20. A computer-implemented method comprising:
switching, by a switch responsive to a computing device, a connection of at least one processor implemented outside a processor core between a first connection and a second connection, wherein the first connection communicatively couples at least one retrieval component between the processor core and one or more non-core portions of a cache hierarchy and the second connection communicatively couples the at least one retrieval component between the one or more non-core portions of the cache hierarchy and a memory;
receiving, by the at least one processor implemented outside the processor core a virtual address translation request;
retrieving, by the at least one processor and in response to virtual address translation request, a physical address; and
returning, by the at least one processor, the physical address.

* * * * *